United States Patent
Yen et al.

(10) Patent No.: US 8,897,705 B2
(45) Date of Patent: Nov. 25, 2014

(54) DATA TRANSMITTING SYSTEM AND DATA TRANSMITTING METHOD

(75) Inventors: Kuang-Yu Yen, Hsinchu County (TW); Chih-Hung Tsai, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 620 days.

(21) Appl. No.: 13/245,883

(22) Filed: Sep. 27, 2011

(65) Prior Publication Data

US 2012/0083212 A1 Apr. 5, 2012

(30) Foreign Application Priority Data

Sep. 30, 2010 (TW) .............................. 99133260 A

(51) Int. Cl.
*H04B 7/00* (2006.01)
*H04W 52/02* (2009.01)
(52) U.S. Cl.
CPC ................................ *H04W 52/0251* (2013.01)
USPC ........................... 455/41.2; 375/222; 710/107
(58) Field of Classification Search
CPC ................................................. H04W 52/0251
USPC ....................................................... 455/41.2
See application file for complete search history.

(56) References Cited

U.S. PATENT DOCUMENTS

| 7,099,969 B2 * | 8/2006 | McAfee et al. ................ 710/107 |
| 2008/0288705 A1 | 11/2008 | Tamir |
| 2009/0006704 A1 | 1/2009 | Gough |
| 2011/0286504 A1 * | 11/2011 | Wang et al. .................... 375/222 |

FOREIGN PATENT DOCUMENTS

| CN | 101055493 A | 10/2007 |
| CN | 101498964 A | 8/2009 |

* cited by examiner

*Primary Examiner* — David Bilodeau
(74) *Attorney, Agent, or Firm* — Winston Hsu; Scott Margo

(57) ABSTRACT

A data transmitting system, comprising: a processor; a first transmitting interface; a first transmitting apparatus; a second transmitting interface; a second transmitting apparatus and a signal transmitting line. The processor enters a power down mode when the first transmitting apparatus does not output data. The first transmitting generates a data transmitting indication signal when the processor is operated in the power down mode and the first transmitting apparatus has data to be output. The second transmitting apparatus generates a recovery signal according to the data transmitting indication signal, and transmits the recovery signal to the processor via the second transmitting interface. Thereby the processor goes back to a normal mode to control the first transmitting apparatus to output data.

16 Claims, 4 Drawing Sheets

DATA TRANSMITTING SYSTEM AND DATA TRANSMITTING METHOD

BACKGROUND OF THE INVENTION

1. Field of the Invention

The present invention relates to a data transmitting system/a data transmitting method utilizing two different transmitting apparatuses, and particularly relates to a data transmitting system/a data transmitting method which can control a processor of the data transmitting system to enter a power down mode.

2. Description of the Prior Art

Current computer apparatus can support different transmitting interfaces and different transmitting apparatuses. For example, a Bluetooth apparatus utilizing a USB (Universal Serial Bus) interface, or a wireless LAN utilizing a PCI (Peripheral Component Interconnect)/a PCI-Express interface. In such kind of hardware structure, the USB controller in the computer apparatus continuously polls a Bluetooth apparatus in the USB interface if any data should be transmitted. Accordingly, the processor in the computer apparatus cannot enter power down mode, such that extra power consumption is caused. Besides, another solution is also provided in the prior art. That is, other transmitting paths are provided to inform the processor that the Bluetooth apparatus has data needed to be transmitted. However, the hardware cost increases for such kind of solution.

SUMMARY OF THE INVENTION

One objective of the present application is to provide a data transmitting system and the data transmitting method, which can control the processor to enter the power down mode without adding extra hard wares.

One embodiment of the present invention discloses a data transmitting system, comprising: a processor; a first transmitting interface; a first transmitting apparatus, utilizing the first interface to output data; a second transmitting interface; a second transmitting apparatus, utilizing the second transmitting interface to output data, wherein the first transmitting interface and the second transmitting interface are different kinds of transmitting interfaces; and a signal transmitting line, coupled between the first transmitting apparatus and the second transmitting apparatus. The processor enters a power down mode when the first transmitting apparatus does not output data, where the first transmitting apparatus generates a data transmitting indication signal when the processor is operated in the power down mode and the first transmitting apparatus has data to be output, the second transmitting apparatus generates a recovery signal according to the data transmitting indication signal and transmits the recovery signal to the processor via the second transmitting interface, such that the processor goes back to a normal mode to control the first transmitting apparatus to output data.

Another embodiment of the present invention discloses a data transmitting method, for a data transmitting system including a processor, a first transmitting apparatus, a second transmitting apparatus, a first transmitting interface and a second transmitting interface, wherein the first transmitting apparatus and the second transmitting apparatus output data via the first transmitting interface and the second transmitting interface, which are different kinds of transmitting interfaces. The data transmitting method comprises: controlling the processor enters a power down mode when the first transmitting apparatus does not output data; controlling the first transmitting apparatus to generate a data transmitting indication signal, when the processor is operated in the power down mode and the first transmitting apparatus has data to be output; controlling the second transmitting apparatus to generate a recovery signal according to the data transmitting indication signal; and transmitting the recovery signal to the processor via the second transmitting interface, such that the processor goes back to a normal mode to control the first transmitting apparatus to output data.

In view of above-mentioned embodiments, the data transmitting system and the data transmitting method according to the present application can control the processor to enter a power down mode, without increasing extra hardware. Also, the controller can enter or leave the power down mode in time, and does not need to continuously poll whether the peripheral apparatus has data to be transmitted. By this way, power consumption can effectively decrease.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
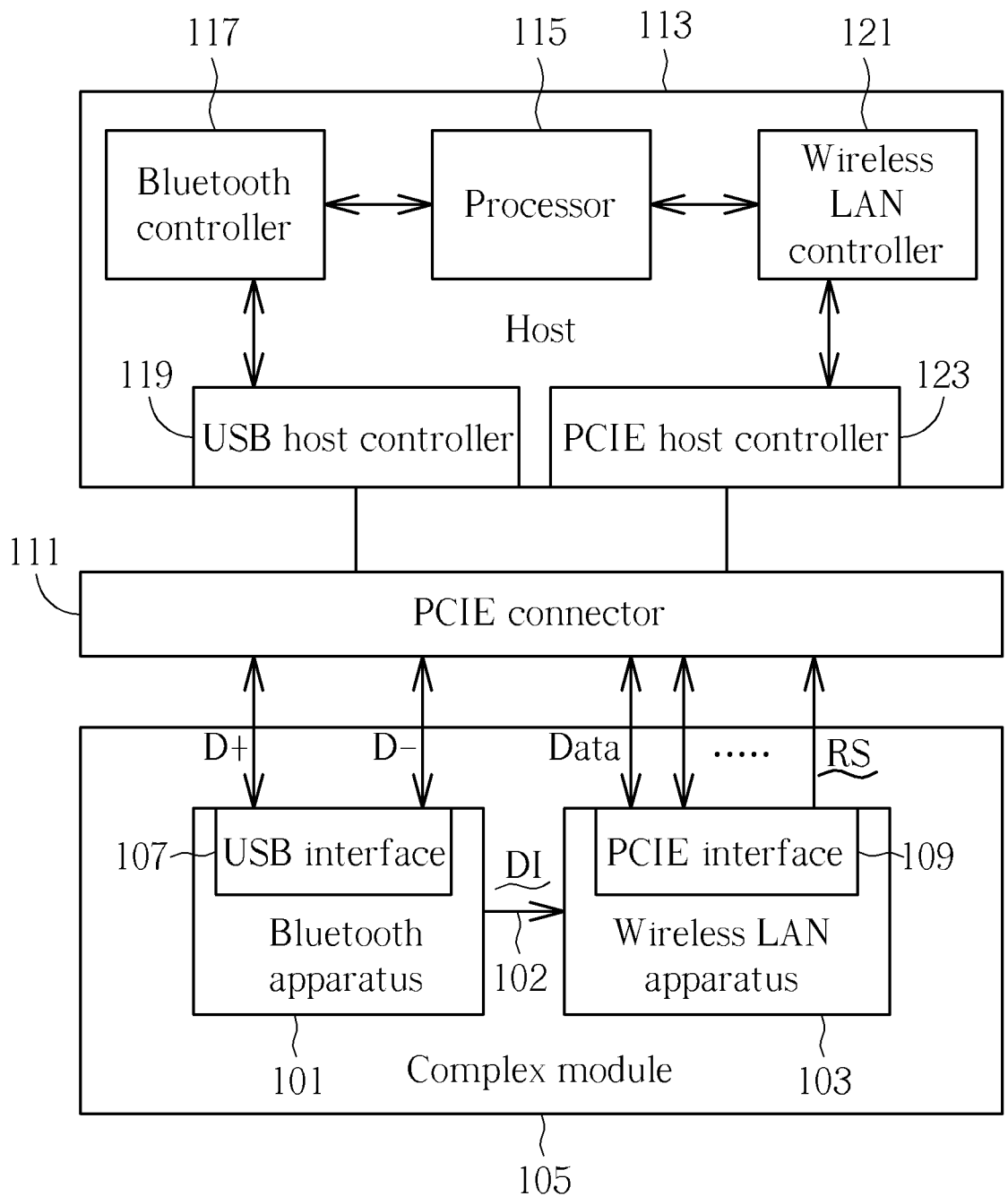
FIG. 1 and FIG. 2 respectively illustrate a data transmitting system according to one embodiment of the present invention.
Figure 2:
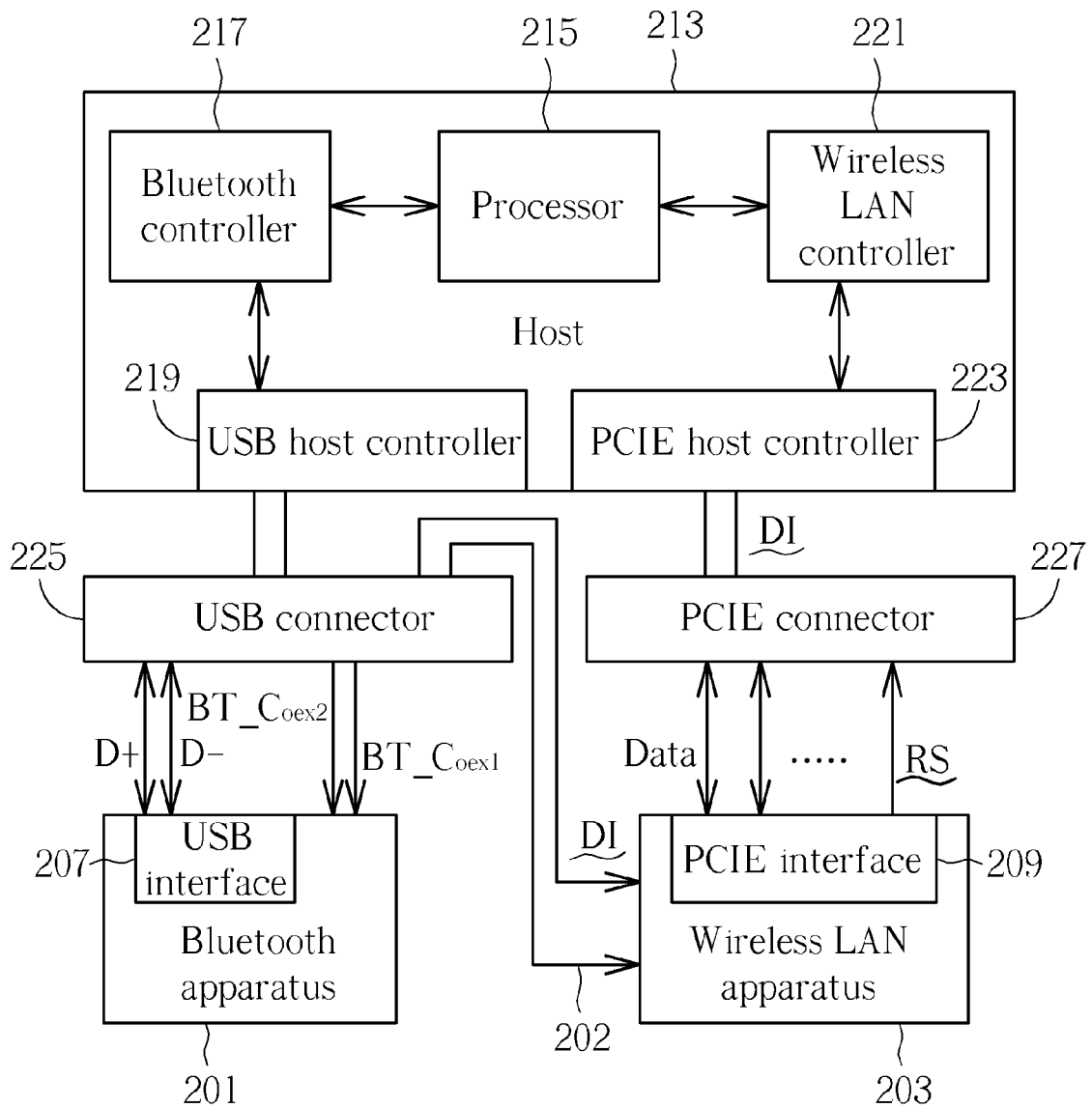

FIG. 1 and FIG. 2 respectively illustrates a data transmitting system according to one embodiment of the present invention. It should be noted that the embodiments shown in FIGS. 1 and 2 are only for example but do not mean to limit the scope of the present application. In the embodiment shown in FIG. 1, the Bluetooth apparatus 101 and the wireless LAN apparatus 103 are provided at a single circuit board to arrange a complex module 105. Also, a signal transmitting line 102 is provided between the Bluetooth apparatus 101 and the wireless LAN apparatus 103. Besides, the Bluetooth apparatus 101 outputs data via a USB interface 107, and the wireless LAN apparatus 103 outputs data through the PCIE interface 109. Both of the USB interface 107 and the PCIE interface 109 are coupled to the host 113 via the PCIE interface 109. The host 113 includes a processor 115, a Bluetooth controller 117, a USB host controller 119, a wireless LAN controller 121 and a PCIE host controller 123. The Bluetooth apparatus 101, the wireless LAN apparatus 103, the USB interface 107, the PCIE interface 109 and the processor 115 can be regarded as a data transmitting system according to the embodiment of the present invention. Also, in this embodiment, the processor 115 is shared with the host 113.

Ordinarily, the processor 115 operates in a normal state. If the Bluetooth apparatus 101 or the wireless LAN apparatus 103 has data to be transmitted to the host 113, the processor 115 respectively controls the Bluetooth controller 117, the USB host controller 119, the wireless LAN controller 121 and the PCIE host controller 123 to complete data transmitting. Since how the processor 115 controls the Bluetooth apparatus 101 and the wireless LAN apparatus 103 to transmit data via the Bluetooth controller 117, the USB host controller 119, the wireless LAN controller 121 and the PCIE host controller 123 is well known by persons skilled in the art, thus it is omitted here for brevity.

If the Bluetooth apparatus 101 does not output data, the processor 115 stops polling whether the Bluetooth apparatus 101 has data to be transmitted, to enter a power down mode. Comparing with the normal mode, the power down mode indicates that the processor 115 operates at a low voltage, such that the processor 115 can not control other devices as well as in the normal mode, but can receive an outer instruction to go back to the normal mode. If the processor 115 is in the power down mode and the Bluetooth apparatus 101 needs to output data, the Bluetooth apparatus 101 generates a data transmitting indicating signal DI. Also, the wireless LAN apparatus 103 generates a recovery signal RS according to the data transmitting indication signal DI and transmits the recovery signal RS to the processor 115 via the PCIE interface 109, such that the processor 115 goes back to a normal mode to control the Bluetooth apparatus 101 to output data. The processor 115 in the normal mode enters the power down mode again if the Bluetooth apparatus 101 stops outputting data or idles for a predetermined period of time. Via this mechanism, the processor 115 can enter the power down mode in time, and needs not to consume power consumption for continuously polling the Bluetooth apparatus 101 in the normal mode.

In this embodiment, the data transmitting indicating signal DI is transmitted from the Bluetooth apparatus 101 to the wireless LAN apparatus 103 via the signal transmitting line 102. Also, the signal transmitting line 102 can comply with GPIO (General Purpose I/O) standard, and the data accessing process between the Bluetooth apparatus 101 and the wireless LAN apparatus 103 can follow I2C (Inter-Intergrated Circuit) standard. The pins of GPIO can be randomly arranged by user via program. The pins thereof can be utilized as GPI or GPO, or GPIO, such as clock generator or chip selecting. I2C indicates Inter-Intergrated Circuit, which is a series communication bus utilizing a master-slave mechanism. It is developed in 1980 years, for the connection between the master board, the embedded system, the mobile phone and low speed peripheral apparatuses. Since GPIO and I2C are known by persons skilled in the art, thus related description is omitted for brevity here. However, please note that it does not mean that the present invention is limited to GPIO and I2C standard.

In the embodiment shown in FIG. 2, the host 213 also has a processor 215, a Bluetooth controller 217, a USB host controller 219, a wireless LAN controller 221 and a PCIE host controller 223. The Bluetooth apparatus 201 outputs data via the USB interface 207, and the wireless LAN apparatus 203 outputs data via the PCIE interface 209. One difference between the embodiments shown in FIG. 1 and FIG. 2 is that the Bluetooth apparatus 201 and the wireless LAN apparatus 203 are located on different circuit boards, and are respectively coupled to independent USB connector 225 and PCIE connector 227.

The operation for the embodiment shown in FIG. 2 is similar with which of the embodiment shown in FIG. 1. Normally, the processor 215 operates in a normal state, the processor 215 respectively controls the Bluetooth controller 217, the USB host controller 219, the wireless LAN controller 221 and the PCIE host controller 223 to complete data transmitting, if the Bluetooth apparatus 201 or the wireless LAN apparatus 203 need to transmit data to the host 213. If the Bluetooth apparatus 201 does not output data, the processor 215 stops polling whether the Bluetooth apparatus 201 transmits data, and enters a power down mode. If the processor 215 is in the power down mode and the Bluetooth apparatus 201 needs to output data, the Bluetooth apparatus 201 generates a data transmitting indicating signal DI. Also, the wireless LAN apparatus 203 generates a recovery signal RS according to the data transmitting indication signal DI and transmits the recovery signal RS to the processor 215 via the PCIE interface 209 and the PCIE connector 227, such that the processor 215 goes back to a normal mode to control data output of the Bluetooth apparatus 201. The processor 215 in the normal mode enters the power down mode again if the Bluetooth apparatus 201 stops outputting data or idles for a predetermined period of time.

In the embodiment shown in FIG. 2, the data transmitting indicating signal DI generated by the Bluetooth apparatus 201 is transmitted to the USB connector 225 and then to the wireless LAN apparatus 203, via the transmitting line 202. In this embodiment, a co-existence control technology can be utilized to control the signal transmitting of the Bluetooth apparatus 201 and the wireless LAN apparatus 203. The co-existence control technology is one kind of control technology in a wireless LAN field. The main purpose thereof is preventing that signals for different kinds of wireless LAN device such as Bluetooth, WiFi and RFID do not disturb to each other.

Figure 3:
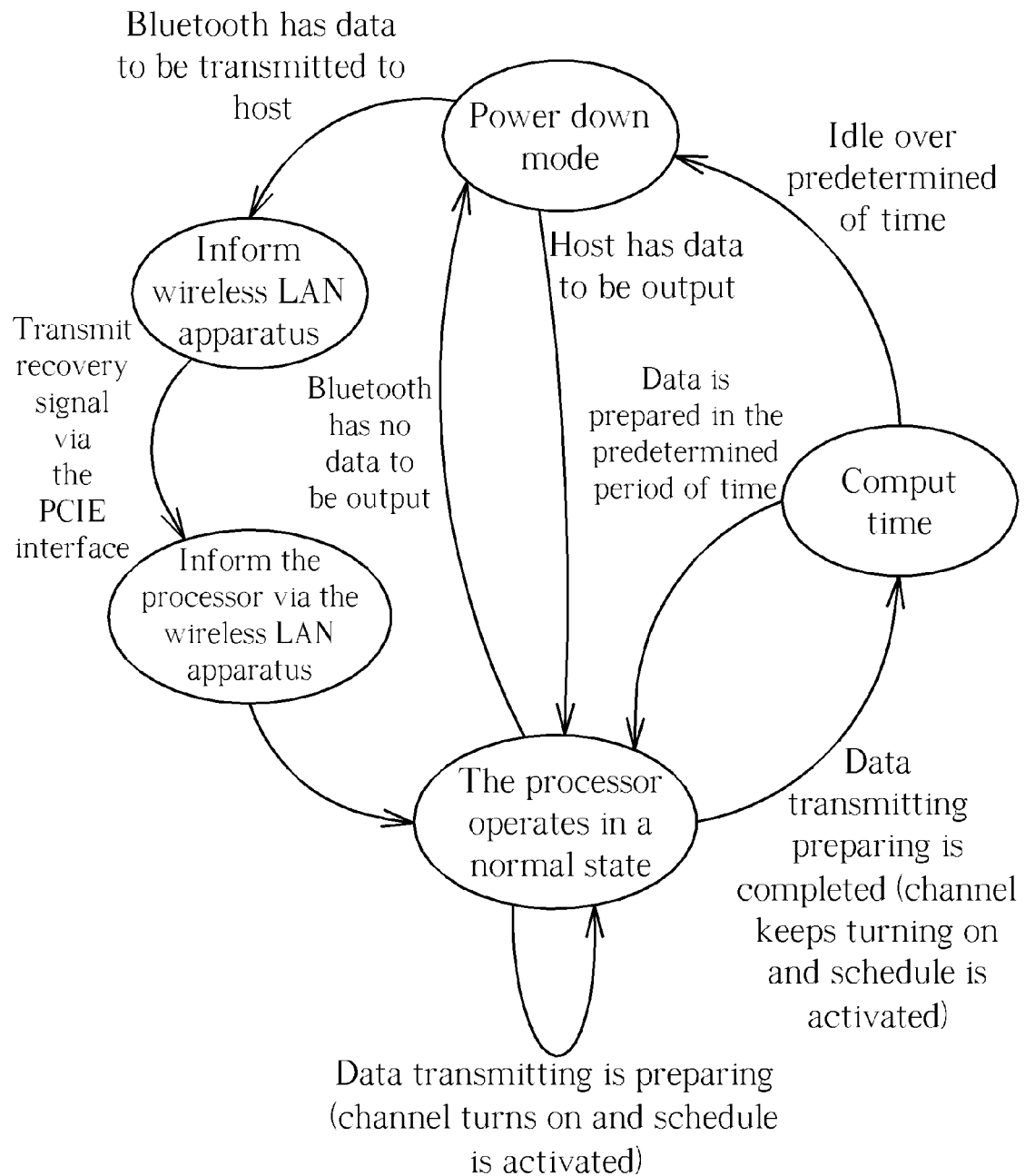
FIG. 3 is a schematic diagram illustrating a state machine of a data transmitting system according to one embodiment of the present application.

FIG. 3 is a schematic diagram illustrating a state machine of a data transmitting system according to one embodiment of the present application. FIG. 1 is taken for example and coordinates with FIG. 3 to explain the concept of the present application in following. If the processor 115 is operated in the power down mode and the Bluetooth apparatus 101 has data to output, the processor 115 informs the wireless LAN apparatus 103, and transmits the recovery signal RS via the PCIE interface 109 (i.e. inform the processor 115 via the wireless LAN apparatus 103). After that, the processor 115 prepares for data transmitting, turns on the channel and actives transmitting schedule. After the data transmitting preparing is completed, time is computing. Such action can be performed via a counter (not illustrated). In this state, the channel keeps turning on and the schedule is activated, but the data to be output is not ready. If the data is still not ready (data error may exists) after a predetermined period of time, the processor 115 goes back to power down mode. If the data is ready in a predetermined time period, the processor instructs the Bluetooth controller 117 to control the Bluetooth apparatus 101 to output data. Then the processor 115 still operates in the normal mode. If the processor 115 is in the normal mode and the Bluetooth apparatus 101 has no data to be output, the processor 115 goes back to the power down mode. If the processor 115 is in the power down mode and some data is needed to be output to the Bluetooth apparatus 101 or the wireless LAN apparatus 103, the processor 115 goes back to the normal mode.

Figure 4:
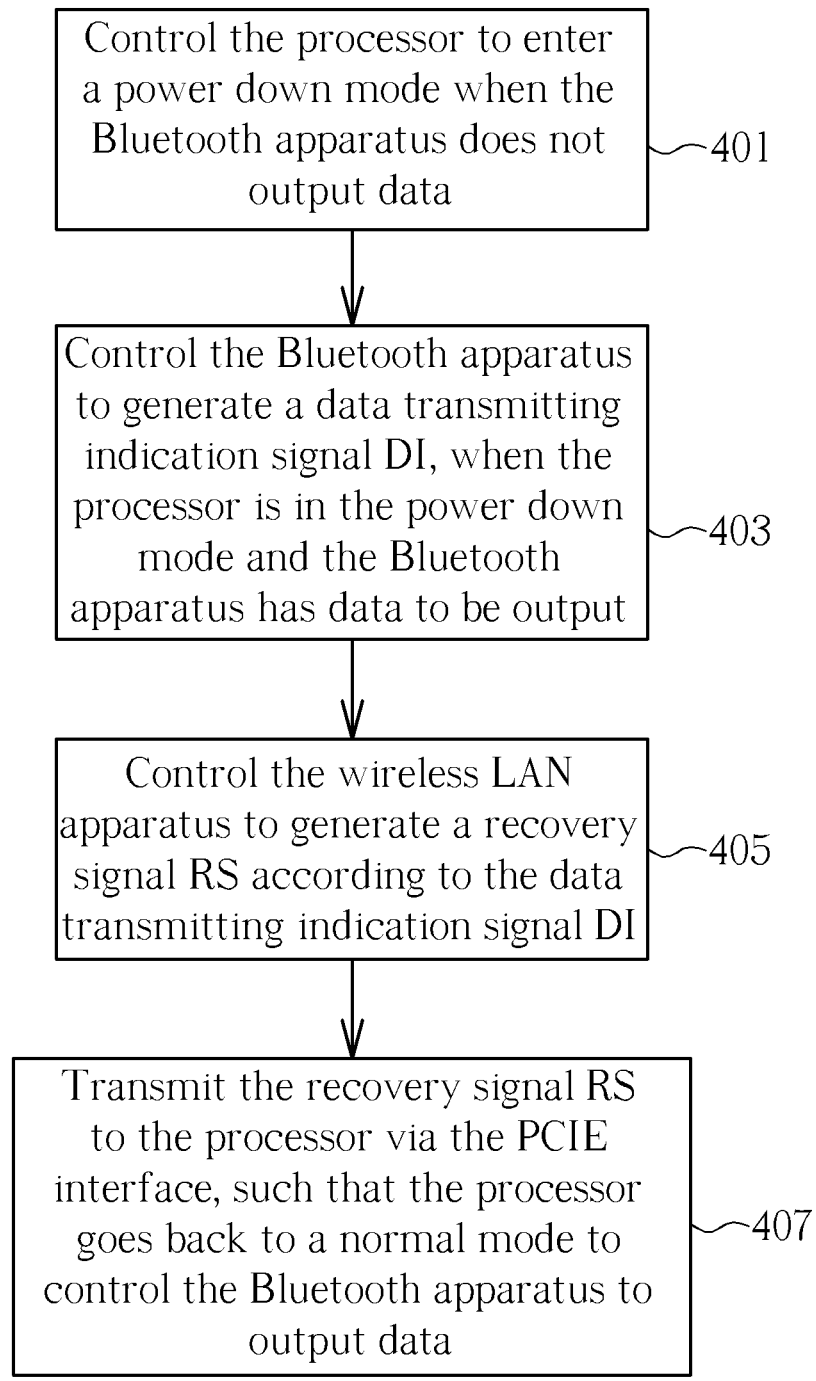
FIG. 4 is a flow chart illustrating a data transmitting method according to one embodiment of the present invention.

In view of above-mentioned embodiments, the data transmitting method in FIG. 4 can be acquired, which utilizes the devices shown in FIG. 1 to explain steps thereof, the same as FIG. 3. The data transmitting method shown in FIG. 4 can include following steps:

Step 401

Control the processor 115 to enter a power down mode when the Bluetooth apparatus 101 does not output data Step 403

Control the Bluetooth apparatus 101 to generate a data transmitting indication signal DI, when the processor 115 is operated in the power down mode and the Bluetooth apparatus 101 has data to be output Step 405

Control the wireless LAN apparatus 103 to generate a recovery signal RS according to the data transmitting indication signal DI.

Step 407

Transmit the recovery signal RS to the processor 115 via the PCIE interface 109, such that the processor goes back to a normal mode to control the Bluetooth apparatus 101 to output data.

Other detail characteristics of the data transmitting method shown in FIG. 4 are already disclosed in above-mentioned embodiments, thus are omitted for brevity. It should be noted that although the Bluetooth apparatus, the wireless LAN apparatus, the USB interface and the PCIE interface are utilized for examples to explain the concept of the present application, the concept disclosed by the present application can be applied to any two kinds of different data transmitting apparatuses utilizing different kinds of data transmitting apparatuses.

In view of above-mentioned embodiments, the data transmitting system and the data transmitting method according to the present application can control the processor to enter a power down mode, without increasing extra hardware. Also, the controller can enter or leave the power down mode in time, and does not need to continuously poll whether the peripheral apparatus has data to be transmitted. By this way, power consumption can effectively decrease.

Those skilled in the art will readily observe that numerous modifications and alterations of the device and method may be made while retaining the teachings of the invention.

What is claimed is:

1. A data transmitting system, comprising:
a processor;
a first transmitting interface;
a first transmitting apparatus, utilizing the first interface to output data;
a second transmitting interface;
a second transmitting apparatus, utilizing the second transmitting interface to output data; and
a signal transmitting line, coupled between the first transmitting apparatus and the second transmitting apparatus;
wherein the processor enters a power down mode when the first transmitting apparatus does not output data; the first transmitting apparatus generates a data transmitting indication signal when the processor is operated in the power down mode and the first transmitting apparatus has data to be output; and the second transmitting apparatus generates a recovery signal according to the data transmitting indication signal and transmits the recovery signal to the processor via the second transmitting interface, such that the processor goes back to a normal mode to control the first transmitting apparatus to output data.

2. The data transmitting system of claim 1, wherein the first transmitting interface is a USB interface, the first transmitting apparatus is a Bluetooth apparatus, the second transmitting interface is a PCIE interface, and the second transmitting apparatus is a wireless LAN apparatus.

3. The data transmitting system of claim 1, wherein the first transmitting interface, the first transmitting apparatus, the second transmitting interface, and the signal transmitting line are located at a single circuit board.

4. The data transmitting system of claim 3, wherein the signal transmitting line complies with GPIO standard.

5. The data transmitting system of claim 1, wherein the first transmitting interface and the first transmitting apparatus are located on a first circuit board, where the second transmitting interface and the second transmitting apparatus are located on a second circuit board.

6. The data transmitting system of claim 5, wherein the signal transmitting line utilizes a co-existence control technique.

7. The data transmitting system of claim 1, wherein the processor in the normal mode enters the power down mode again if the first transmitting apparatus stops outputting data or idles for a predetermined period of time.

8. The data transmitting system of claim 1, wherein the first transmitting interface and the second transmitting interface are different kinds of transmitting interfaces.

9. A data transmitting method applied in a data transmitting system including a processor, a first transmitting apparatus, a second transmitting apparatus, a first transmitting interface and a second transmitting interface,
wherein the first transmitting apparatus and the second transmitting apparatus output data via the first transmitting interface and the second transmitting interface respectively, comprising:
controlling the processor to enter a power down mode when the first transmitting apparatus does not output data;
controlling the first transmitting apparatus to generate a data transmitting indication signal, when the processor is operated in the power down mode and the first transmitting apparatus has data to be output;
controlling the second transmitting apparatus to generate a recovery signal according to the data transmitting indication signal; and
transmitting the recovery signal to the processor via the second transmitting interface, such that the processor goes back to a normal mode to control the first transmitting apparatus to output data.

10. The data transmitting method of claim 9, wherein the first transmitting interface is a USB interface, the first transmitting apparatus is a Bluetooth apparatus, the second transmitting interface is a PCIE interface, and the second transmitting apparatus is a wireless LAN apparatus.

11. The data transmitting method of claim 9, wherein the first transmitting interface, the first transmitting apparatus, the second transmitting interface, and the signal transmitting line are located at a single circuit board.

12. The data transmitting method of claim 11, wherein the signal transmitting line complies with GPIO standard.

13. The data transmitting method of claim 9, wherein the first transmitting interface and the first transmitting apparatus are located on a first circuit board, where the second transmitting interface and the second transmitting apparatus are located on a second circuit board.

14. The data transmitting system of claim 13, wherein the signal transmitting line utilizes a co-existence control technique.

15. The data transmitting system of claim 9, further comprising: controlling the processor in the normal mode to enter the power down mode again if the first transmitting apparatus stops outputting data or idles for a predetermined period of time.

16. The data transmitting system of claim 9, wherein the first transmitting interface and the second transmitting interface are different kinds of transmitting interfaces.

\* \* \* \* \*